June 28, 1949.　　　G. RANKENBURG　　　2,474,368
SELF-FEEDER ATTACHMENT
Filed April 22, 1946

Inventor
Gunther Rankenburg

By Clarence A. O'Brien
and Harvey B. Jacobson
Attorneys

Patented June 28, 1949

2,474,368

UNITED STATES PATENT OFFICE 2,474,368

SELF-FEEDER ATTACHMENT

Gunther Rankenburg, Millville, Minn.

Application April 22, 1946, Serial No. 663,861

2 Claims. (Cl. 251—10)

This invention relates to improvements in self-feeder attachments for feed and water troughs.

An object of the invention is to provide an improved self-closing animal operated feeding valve for feed and water troughs.

Another object of the invention is to provide an improved feed valve for attaching to a water or feed supply barrel or tank, whereby a hog or pig, or other animal, may open the valve to admit water or feed to a trough by operating the valve with its nose, and said valve being spring closed, will automatically close off water or feed supply to the trough while the animal is eating or drinking, thereby saving much waste of feed and water, and also saving a considerable amount of a farmer's time.

A further object of the invention is to provide an improved animal operated spring closed feed valve wherein the mechanism of the valve is protected from injury when an animal is rooting at the valve to operate the same.

Another object of the invention is to provide an improved spring closed feed valve which will be operated by a hog or pig, or another animal, said valve being highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
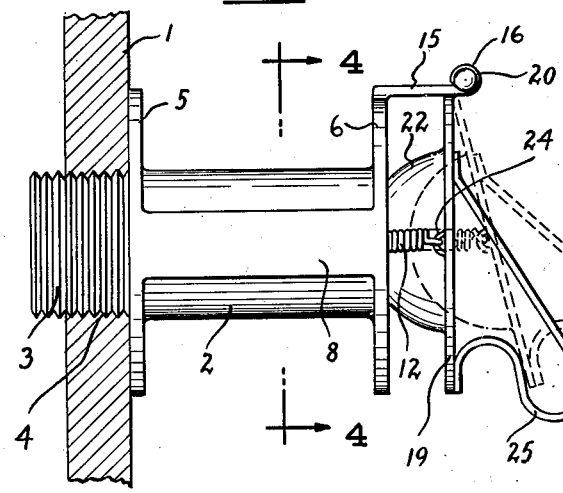
Figure 1 is a side elevation of the improved animal operated feed valve, showing in dotted lines the open position of the valve closure member.
Figure 2:
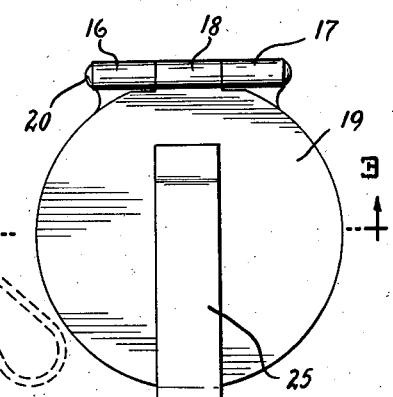
Figure 2 is an end view of the improved animal operated feed valve.
Figure 3:
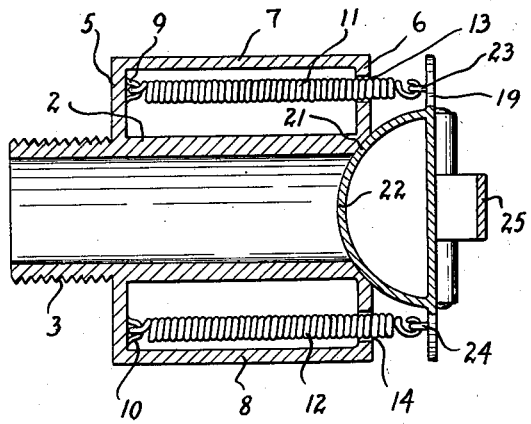
Figure 3 is a sectional view taken on the line 3—3 of Figure 2.
Figure 4:
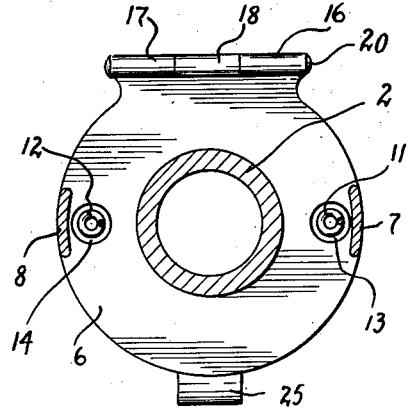
Figure 4 is a view taken on the line 4—4 of Figure 1.

In carrying out the invention, there is provided an improved animal actuated feed valve for a feed or water storage tank or barrel 1, said valve being formed with a cylindrical or tubular hollow body 2, being externally threaded as at 3 at its inner end for screwing into a threaded outlet 4 in the storage tank or barrel 1.

Spaced annular flanges 5 and 6 will be formed integrally on the adjacent inner and outer ends of the valve body 2, the flange 5 being adapted to contact the adjacent wall of the feed or water supply tank or barrel 1 when the valve is in operative position therein.

The spaced annular flanges 5 and 6 will be connected together by the integrally cast or formed spring protecting webs or guard strips 7 and 8 disposed at the opposite sides of said valve body 2.

The eyes 9 and 10 are formed on the inner surface of the annular flange 5 at diametrically opposite points and support the coil springs 11 and 12, respectively, which extend longitudinally of the valve body 2 between said valve body and the opposed webs or guard strips 7 and 8, said springs 11 and 12 being extended outwardly through the diametrically opposed apertures 13 and 14 formed through the annular flange 6, to be connected with the hinged valve closure later to be described.

A forwardly extending lip 15 is integrally formed on the annular flange 6 and is curled at its outer end to form the spaced hinge ears 16 and 17, between which the hinge ear 18 formed on the disc-shaped valve closure plate 19 is disposed. A pintle or hinge pin 20 is extended through the ears 16, 17 and 18, so that the valve closure plate 19 will swing freely on the hinge pin 20.

A rounded annular valve seat 21 is formed about the outer end of the valve body 2, and is adapted to receive and seat the rounded or semi-spherical shaped valve closure member 22 formed on the adjacent surface of the closure plate 19.

Eyes 23 and 24 will be formed at diametrically opposite points on the inner surface of the closure plate 19 and will support the outer ends of the coil springs 11 and 12, to resiliently tension said closure plate 19 to hold the valve plug or closure member 22 on its seat 21.

A depending forwardly extending looped nose engaging arm or member 25 will be formed on or secured to the outer surface of the hinged valve closure plate 19, whereby a hog or pig, or other animal may root the arm or member 25 to open the valve to permit food or water to enter from the supply tank or barrel into a feed trough (not shown).

From the foregoing description, it will be apparent that there has been provided a highly efficient form of self feeder attachment or feed valve for feed or water storage tanks or barrels, which will discharge feed or water to a feed trough only when actuated by the animal.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. An animal-operated feed valve including a hollow body having attaching threads formed upon one end and an annular valve seat on its opposite end, an anchoring flange formed about said body adjacent said threads, an annular flange formed about the opposite end of said body, oppositely disposed guard strips connected between said flanges, an outwardly extending lip on said last-mentioned annular flange, a disk-shaped valve closure plate hinged upon said lip, a semi-spherical shaped valve closure supported by said valve closure plate, and resilient tensioning means between said valve closure plate and said anchoring plate disposed interiorly of said guard strips, for normally holding said valve closure upon its valve seat.

2. An animal-operated feed valve including a hollow body having attaching threads formed upon one end and an annular valve seat on its opposite end, an anchoring flange formed about said body adjacent said threads, an annular flange formed about the opposite end of said body, oppositely disposed guard strips connected between said flanges, an outwardly extending lip on said last-mentioned annular flange, a disk-shaped valve closure plate hinged upon said lip in parallel spaced relation with said last-mentioned flange, a semi-spherical shaped valve closure supported by said valve closure plate, resilient tensioning means between said valve closure plate and said anchoring plate disposed interiorly of said guard strips for normally holding said valve closure upon its valve seat, and an outwardly and downwardly extending looped nose-engaging valve actuating arm disposed upon said valve closure plate to overlie and extend forwardly of the same.

GUNTHER RANKENBURG.

REFERENCES CITED

The following references are of record in the file of this patent:

UNITED STATES PATENTS

| Number | Name | Date |
| --- | --- | --- |
| 413,941 | Hawkins | Oct. 29, 1889 |
| 1,605,399 | Fornaca | Nov. 2, 1926 |
| 1,827,913 | Rymal | Oct. 20, 1931 |
| 2,259,128 | Egan | Oct. 14, 1941 |
| 2,355,408 | Wyss | Aug. 8, 1944 |